Patented Oct. 21, 1924.

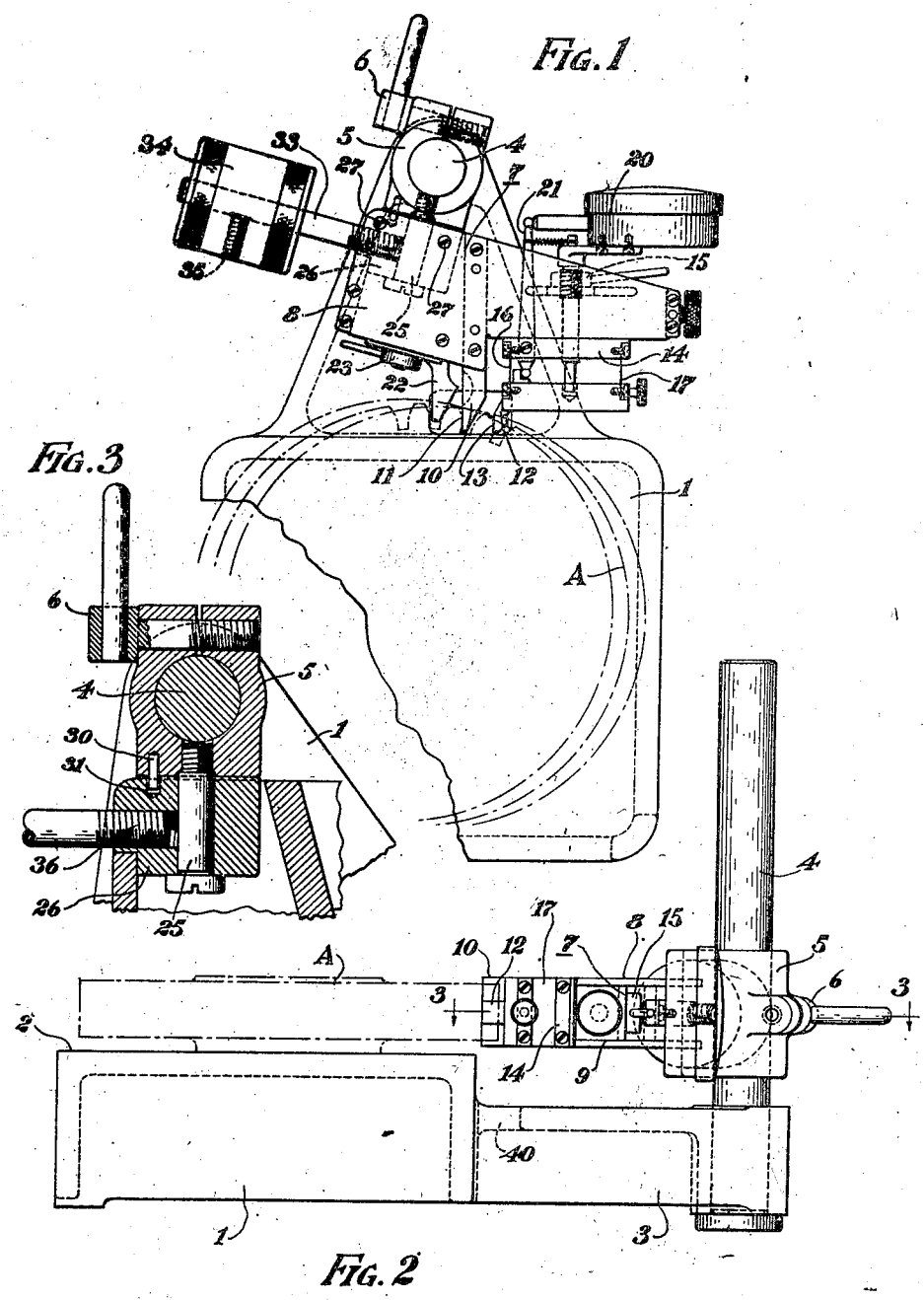

1,512,626

UNITED STATES PATENT OFFICE.

PAUL M. MUELLER, OF HARTFORD, CONNECTICUT, ASSIGNOR TO PRATT & WHITNEY COMPANY, OF NEW YORK, N. Y., A CORPORATION OF NEW JERSEY.

BENCH-TYPE GEAR-TESTING MACHINE.

Application filed January 11, 1922. Serial No. 528,469.

*To all whom it may concern:*

Be it known that I, PAUL M. MUELLER, a citizen of the United States, residing at Hartford, in the county of Hartford and State of Connecticut, have invented certain new and useful Improvements in Bench-Type Gear-Testing Machines, of which the following is a specification.

This invention relates to an improved form of gear testing machine of the type disclosed in the application of H. D. Tanner, Serial No. 454,989, for gear testing device, filed March 24, 1921.

An object of the present invention is to provide a gear testing device which will permit the gear being tested to be placed upon a plane surface provided on a base and oscillated or rolled past gear tooth engaging members provided on the device adjustably fixed relative to the base.

Another object of the invention is to mount a gear testing device preferably of the type disclosed in the above referred to application upon a post or other support adjacent a table so that it may be held properly in any desired vertical position and the gear tested by being rolled in contact therewith.

A further object of the invention is to mount the device upon the post or support in such a manner that a slight amount of angular movement may be permitted about an axis parallel to the base so that the tooth engaging members of the device may contact properly along elements of the gear being tested.

Another object of the invention is to provide means to rigidly clamp the device to the support so that it may be prevented from oscillating, these means permitting the convenient clamping or unclamping of the device as desired.

With these and other objects in view, my invention consists in the features of construction and operation set forth in the following specification and illustrated in the accompanying drawings.

In the accompanying drawings annexed hereto and forming a part of this specification, I have shown my invention embodied in a bench type of gear testing device for spur gears but it will be understood that the invention can be adapted for other forms of gears and that the drawings are not to be construed as defining or limiting the scope of the invention, the claims appended to this specification being relied upon for that purpose.

In the drawings:

Figure 1 is a plan view of the complete device forming the present invention;

Fig. 2 is an elevation of the same;

Fig. 3 is a sectional view of a part of the device taken on line 3—3 of Fig. 2.

In the above mentioned drawings, I have shown but one embodiment of the invention which is now deemed preferable but it is to be understood that changes and modifications may be made within the scope of the appended claims without departing from the spirit of the invention.

Briefly, my invention in its broadest aspect comprises the following principal parts: first, a small bench or table forming the base of the machine; second, a support fixed in position thereon and extending perpendicularly from the plane upper surface of the base; third, a gear testing device adjustably mounted on the support; fourth, a connection between the support and the gear testing device permitting limited oscillation of the device relative to its support about an axis normal to the support and parallel to the plane of the base; fifth, means to rigidly clamp the device to the support; and sixth, gear tooth contacting members on the testing device corresponding in every way to the members in the gear testing device disclosed in the above referred to copending application.

Referring more in detail to the figures of the drawing, the base 1 of the machine comprises a table or plate having an upper plane surface 2. Near one end, preferably on an extension 3 of the base is a support 4 fixed in position on the base and extending perpendicularly from the plane 2 of the upper surface of the base. As shown in the figures, this support 4 comprises a cylindrical post or rod which in the position in which the device is normally used extends in a vertical or slightly inclined direction.

On this support 4 is a clamping device comprising a split collar 5 which may be adjusted along the support 4 and clamped in any adjusted position thereon by means of the clamping screw 6, as shown.

The gear testing device indicated generally at 7 comprises members as shown in the copending application referred to above, and the body member of this device is formed by two spaced plates 8 and 9 to which the gear tooth contacting members 10 and 12 are adjustably mounted. One member 10 having a plane surface 11 adapted to contact with a gear tooth surface is fixed in adjusted position, and a member 12 having a surface 13 parallel to the plane surface 11 of the first member 10 is provided which may be adjusted toward or from the first member by adjustment of the block 14 and fixed in adjusted position by clamping screw 15. Also, this second member 12 is carried by flexible springs 16 and 17 so that its position is resiliently adjustable and is held with its surface 13 always parallel to the tooth contacting surface 11 of the first member 10. By means of a dial indicator or other form of position indicator 20 the position of this second contacting member 12 during the testing operation may be accurately determined. The connection between the second member 12 and the dial indicator 20 is by a multiplying lever 21 so that minute movements of the member are readily observed. A third gear tooth contacting member 22 is mounted on the opposite side of the first member 10 and is held in any adjusted position by means of a clamping screw 23, as shown. This contacting member 22 operates to always hold the gear with its tooth surfaces in contact with surfaces 11 and 13 of the other members 10 and 12. The two parallel contacting surfaces 11 and 13 of the tooth contacting members 10 and 12 and member 22 just described comprise three surfaces of a rack, two surfaces being on corresponding sides of adjacent teeth and the third surface on the opposite side of another tooth. By the adjustments shown, the device may be adapted for testing gears having widely different pitches. A gear A is shown in the figures in position for testing.

It is obvious that if the contacting surfaces 11 and 13 of the tooth engaging members were not properly mounted on the support then under certain circumstances the contact between the flanks of the gear teeth and the testing device would not be along lines extending parallel to the pitch elements of the gear teeth. I therefore permit a slight oscillation of the device 7 together with the tooth contacting members 10 and 12 so that the surfaces 11 and 13 may adjust themselves easily into correct position to engage the gear teeth. I accomplish this by providing a stud 25 or screw outstanding from the collar 5 adjustable along the support 4, the stud 25 extending in an axis normal to the axis of the support 4 and therefore parallel to the plane surface 2 of the base 1. Inserted between the two plates 8 and 9 forming the body member 7 of the testing device is a block 26 fixed in position thereon by screws 27, as shown. The stud 25 extends easily through a hole provided in this block 26. In this way, the gear testing device 7 may be oscillated about an axis parallel to the plane of the base to adjust or tilt the tooth contacting surfaces 11 and 13 of the device 7 into correct engaging position. To limit this oscillating movement, I mount a small pin 30 in the clamping collar 5, the outstanding end of which engages an arcuate slot or hole 31 formed in the block 26 fastened in position between the plates of the gear testing device 7.

From the figures of the drawing, it will thus be noted that the block 26 holding the testing device 7 in position on the support 4 is at one side of the device so that the device is not properly balanced for convenient operation. I therefore mount a bar or rod 33 in this block 26 extending as shown in a direction opposite to that of the weight of the device. On this bar or rod I mount a counterweight 34, the position of which may be adjusted along the rod 33 and clamped in adjusted position thereon by means of the screw 35, as shown.

It is sometimes desirable to rigidly clamp the device 7 to its support 4 so that it may not be oscillated. To accomplish this, I provide the rod 33 with screw threads 36 so that by rotation of this rod 33 the forward end thereof may be forced against the stud 25 thus holding the device 7 rigidly to the stud 25 and preventing any oscillation.

Preferably an orifice 40 is formed in the base 1 directly under the position assumed by the tooth engaging members on the device 7. This permits a light to be placed below the base thus enabling the contact of the gear teeth with the contacting members to be more readily observed.

What I claim is:

1. A device for testing gears comprising in combination, a base, a support fixed thereto, and a gear testing device mounted on said support, said device having gear tooth engaging members movable relatively to each other and adapted to engage sides of teeth of a gear positioned on said base, said members engaging the gear being tested upon straight line elements of the tooth surface.

2. A device for testing gears comprising in combination, a base, a support fixed thereto, and a gear testing device adjustably mounted on said support, said device having gear tooth engaging members movable relatively to each other and adapted to engage sides of teeth of a gear positioned on said base, said members engaging the gear being tested upon straight line elements of the tooth surface.

3. A device for testing gears comprising in combination, a base, a support fixed thereto, and a gear testing device adjustably mounted on said support, said device having gear tooth engaging members movable relatively to each other and adapted to engage corresponding sides of adjacent teeth of a gear positioned on said base, said members engaging the gear being tested upon straight line elements of the tooth surface.

4. A device for testing gears comprising in combination, a base, a support fixed thereto, a gear testing device adjustably mounted on said support, said device having gear tooth engaging members adapted to engage corresponding sides of adjacent teeth of a gear positioned on said base, and means permitting said device to be tilted about an axis parallel to a plane surface on said base.

5. A device for testing gears comprising in combination, a base, a support fixed thereto, and a gear testing device adjustably and oscillatably mounted on said support, said device having gear tooth engaging members adapted to engage sides of teeth of a gear positioned on said base.

6. A device for testing gears comprising in combination, a base, a support extending in a direction normal to said base, a gear testing device adjustably mounted on said support, gear tooth engaging members on said device having their engaging surfaces extending approximately normally to the plane of the base and adapted to engage sides of teeth of a gear positioned on said base, and means permitting limited oscillation of said testing device about an axis parallel to said base.

7. A device for testing gears comprising in combination, a base, a support extending in a direction normal to said base, a gear testing device adjustably mounted on said support, adjustable gear tooth engaging members on said device having their engaging surfaces extending approximately normally to the plane of the base and adapted to engage corresponding sides of teeth of a gear positioned on said base, and means permitting limited oscillation of said testing device about an axis parallel to said base.

8. A device for testing gears comprising in combination, a base, a support extending in a direction normal to said base, a gear testing device adjustably mounted on said support, gear tooth engaging members on said base having their engaging surfaces extending parallelly to each other and being approximately normal to the plane of the base, said surfaces being adapted to engage corresponding sides of teeth of a gear positioned on said base, and means permitting limited oscillation of said testing device about an axis parallel to said base.

In testimony whereof, I hereto affix my signature.

PAUL M. MUELLER.